United States Patent [19]
Tintle

[11] Patent Number: 5,174,187
[45] Date of Patent: Dec. 29, 1992

[54] SHEAR MECHANISM FOR GLASSWARE FORMING MACHINE

[75] Inventor: William C. Tintle, Waterford, Conn.

[73] Assignee: Emhart Glass Machinery Investments Inc., Wilmington, Del.

[21] Appl. No.: 814,743

[22] Filed: Dec. 24, 1991

[51] Int. Cl.⁵ .............................................. C03B 5/38
[52] U.S. Cl. ...................................... 83/623; 83/700; 65/334
[58] Field of Search ................. 83/150, 162, 600, 618, 83/620, 623, 694, 698, 700; 65/133, 303, 332, 334

[56] References Cited

U.S. PATENT DOCUMENTS

| | | | |
|---|---|---|---|
| 3,579,319 | 5/1971 | Wythe et al. | 83/623 X |
| 4,214,497 | 7/1980 | Dahms | 83/640 |
| 4,791,845 | 12/1988 | Wright | 83/150 |
| 4,924,740 | 5/1990 | Wright | 83/623 X |

Primary Examiner—Frank T. Yost
Assistant Examiner—Eugenia A. Jones
Attorney, Agent, or Firm—Spencer T. Smith

[57] ABSTRACT

A shear mechanism is disclosed including reciprocating pairs of upper and lower shears. A gob guide is associated with each upper shear blade and can be selectively adjusted in the direction of shear movement and in a direction transverse to that movement.

4 Claims, 5 Drawing Sheets

SHEAR MECHANISM FOR GLASSWARE FORMING MACHINE

Glassware such as bottles are conventionally manufactured in an individual section (I.S.) machine. Such a machine has a plurality of individual sections which may produce one, two, three or four bottles each cycle.

Each container is formed from a gob which is sheared by a pair of reciprocating shears from a vertical runner of molten glass supplied by a suitable feeder. The lower shear blade has a tendency of pushing the top of the severed gob towards the other side of the mechanism forming a banana shaped gob and this is undesirable. To minimize this problem, a gob drop guide is utilized to limit such movement of the top of the gob. U.S. Pat. Nos. 4,214,497 and 4,791,845 disclose mechanisms for controlling the position of the drop guide.

It is an object of the present invention to provide an improved mechanism for controlling the position of a drop guide in a shear mechanism.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings.

Figure 1:
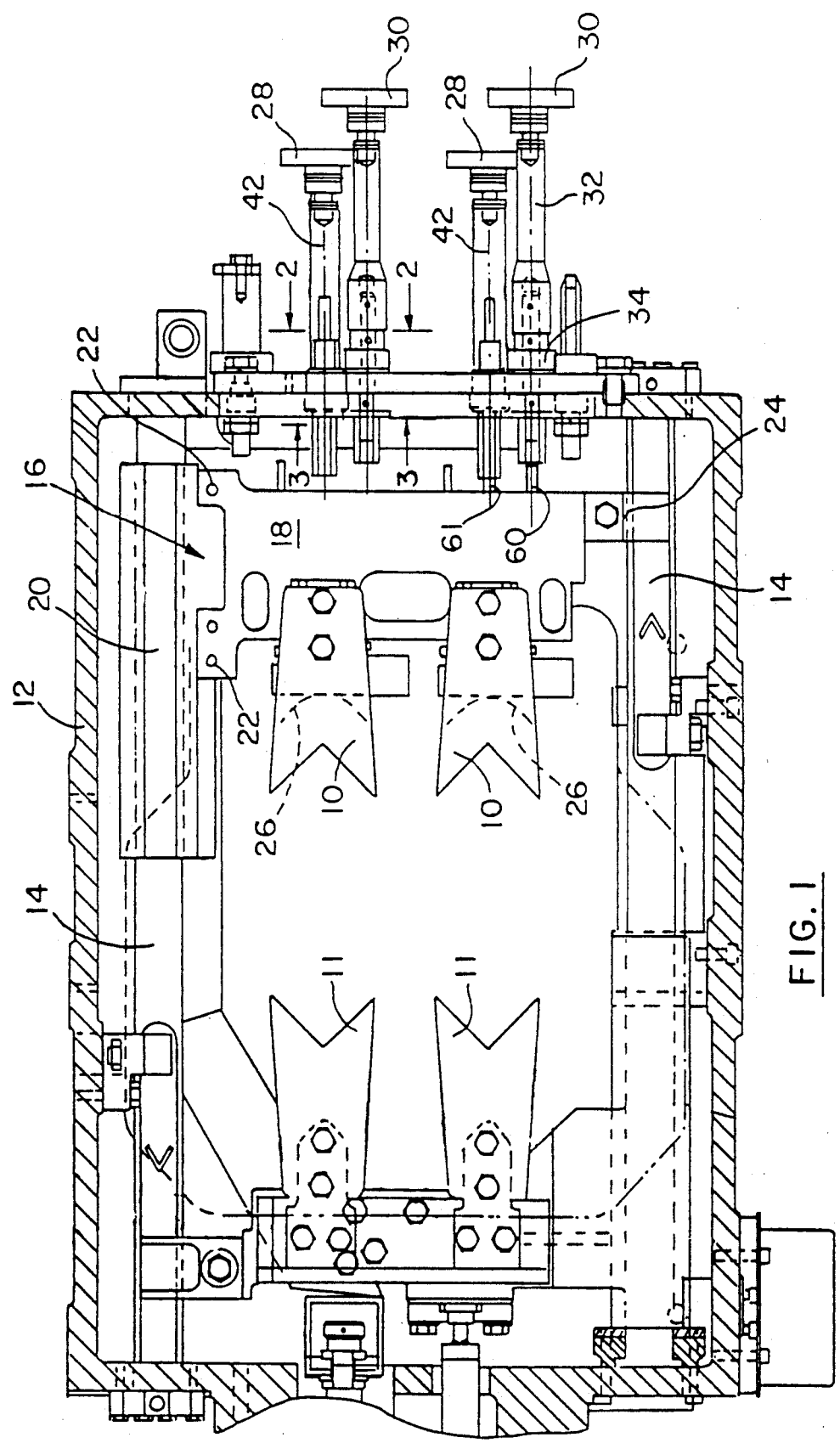
FIG. 1 is a top view of a portion of a shear mechanism made in accordance with the teachings of the present invention.

The shear mechanism has pairs (two in the illustrated embodiment) of opposed upper 10 and lower 11 shears which are supported within a frame 12 for reciprocating displacement. A pair of guide shafts 14 extend along either side of the frame and slidably support the upper blade assembly 16 which includes a shear assembly housing 18 and an elongated tubular guide shaft support 20. The housing 18 is secured at one side via screws 22 to the guide shaft support 20 and is slidably interconnected with the lower guide shaft 14 by a bearing support 24.

Figure 3:
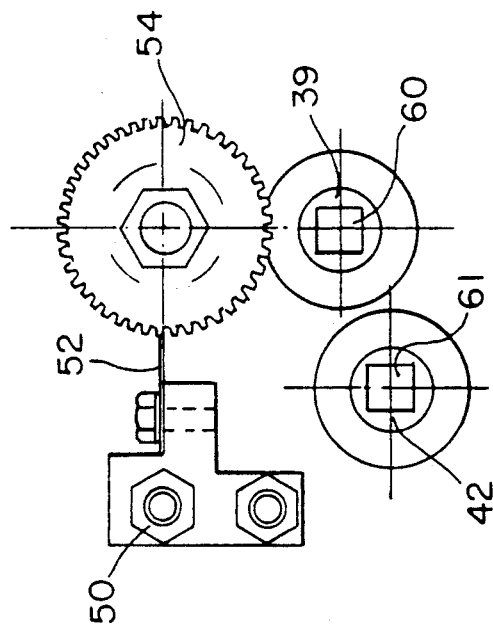
FIG. 3 is a view taken at 3—3 of FIG. 1.
Figure 2:
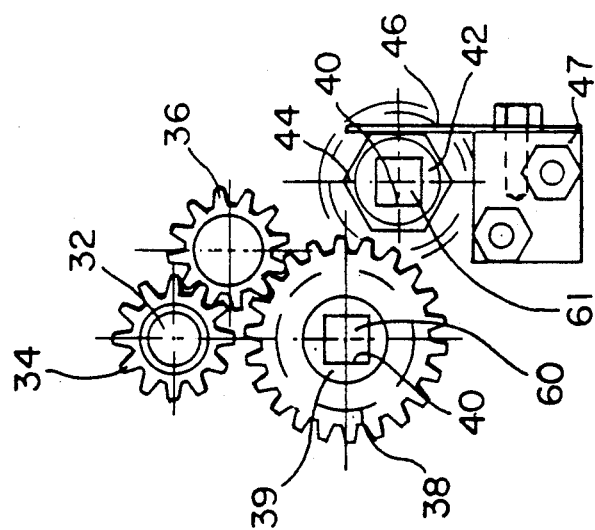
FIG. 2 is a view taken at 2—2 of FIG. 1.

Associated with each upper shear blade 10 is a drop guide 26. The position of each drop guide 26 is independently changeable laterally from side to side (transverse displacement) and forwardly and rearwardly (longitudinal displacement) relative to the shear blade 10. Rotation of the associated longitudinal displacement knob 28 will result in the longitudinal displacement of the drop guide 26 and rotation of an associated transverse displacement knob 30 will result in the transverse displacement of the drop guide. Rotation of the transverse displacement 30 knob rotates a shaft 32 and attached drive gear 34 (FIG. 2) which via an idler 36 rotates a driven gear 38 secured to a drive shaft 39 having a bore 40 which is square in cross section. The longitudinal displacement drop guide knob 28 is connected to a drive shaft 42 which also has a square bore 40. A hex surface 44 is defined on the shaft outer diameter which operates together with a spring 46 supported by a block 47 to define a detent to hold the shaft at a desired orientation. Also secured to the frame 12 is a block 50 (FIG. 3) supporting a spring 52 which is operatively associated with an enlarged fine toothed wheel 54 which is secured to the gob guide transverse displacement shaft 32 so that lateral adjustments can be made in fine increments. As can be seen from FIG. 1, each of the drop guide drive shafts 39, 42 receives a driven shaft 60, 61 which extends rearwardly from the shear assembly housing 18 and which has a matching square cross section. The length of both the drive shafts and the driven shafts is selected so that they will be operatively associated throughout the displacement of the shear assembly housing 18.

Figure 4:
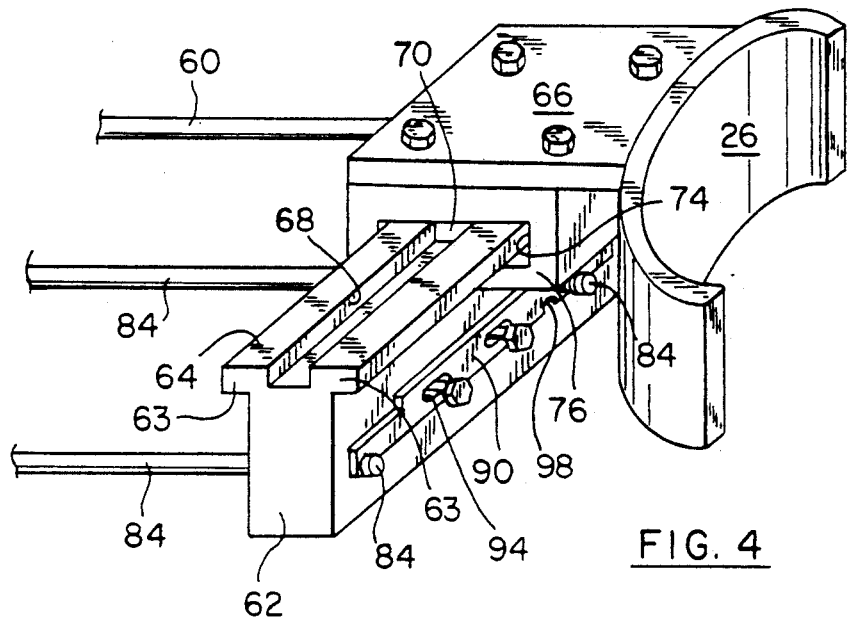
FIG. 4 is an oblique view of a drop guide assembly.
Figure 5:
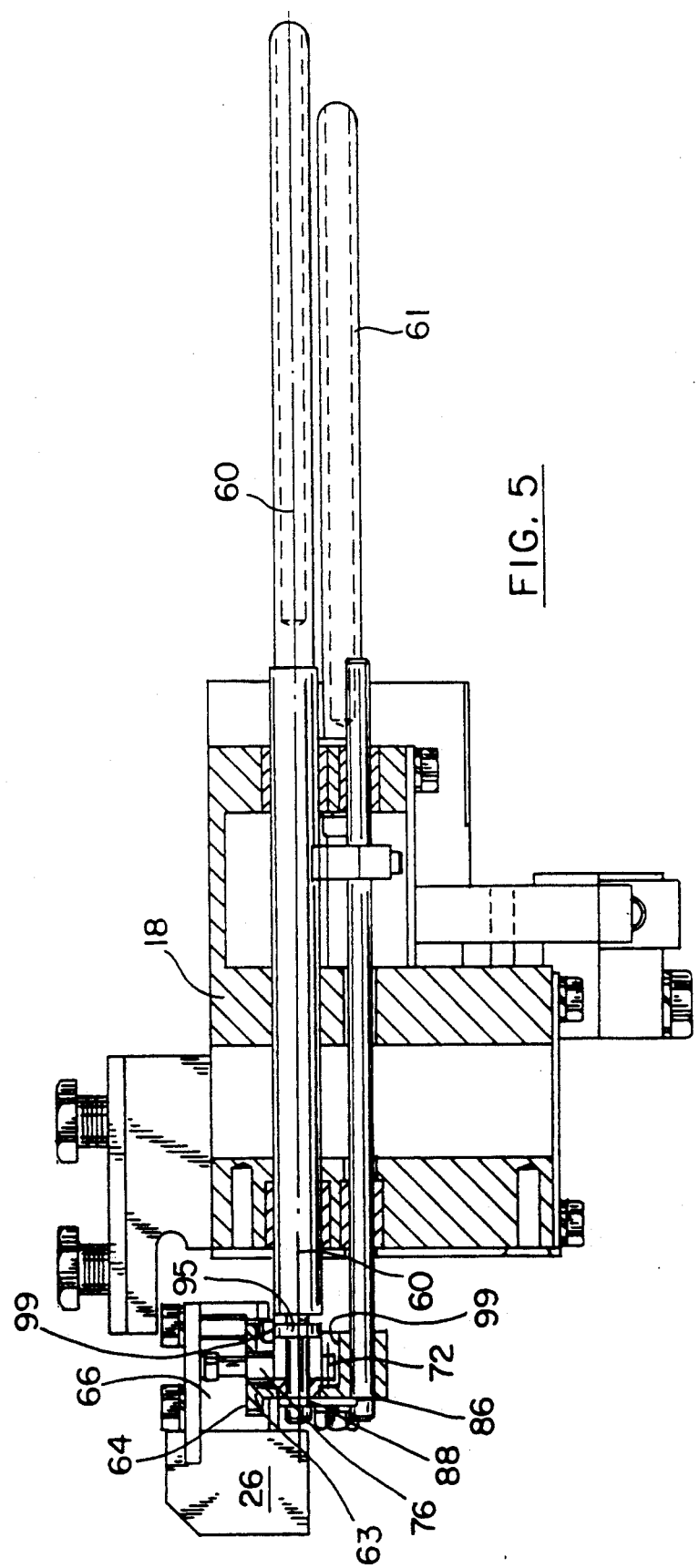
FIG. 5 is a view taken at 5—5 of FIG. 6.

Each drop guide assembly (FIG. 4) includes a base 62 having opposed transverse top flanges 63 which define a slide surface 64 supporting and guiding the lateral displacement of the gob drop guide support block 66 to which the drop guide 26 is secured. The slide includes a lateral groove 68 which receives a rack 70 secured to the bottom of the block 66 and driven by a pinion 72 (FIG. 5) secured to the end of the drop guide transverse displacement driven shaft 60. The block has a laterally extending opening 74 which is partially defined by opposed inwardly extending shelves 76 for capturing the base flanges 63.

Figure 7:
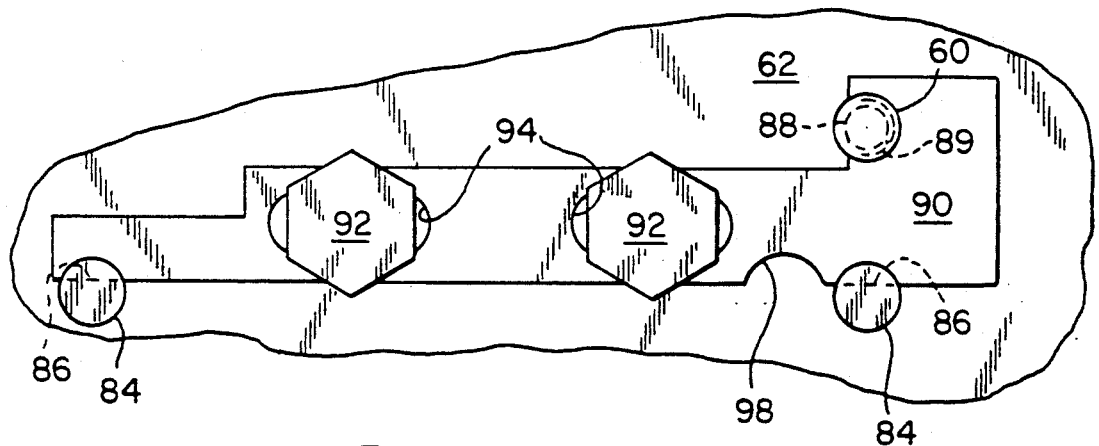
FIG. 7 is a front view of the drop guide connecting plate.
Figure 6:
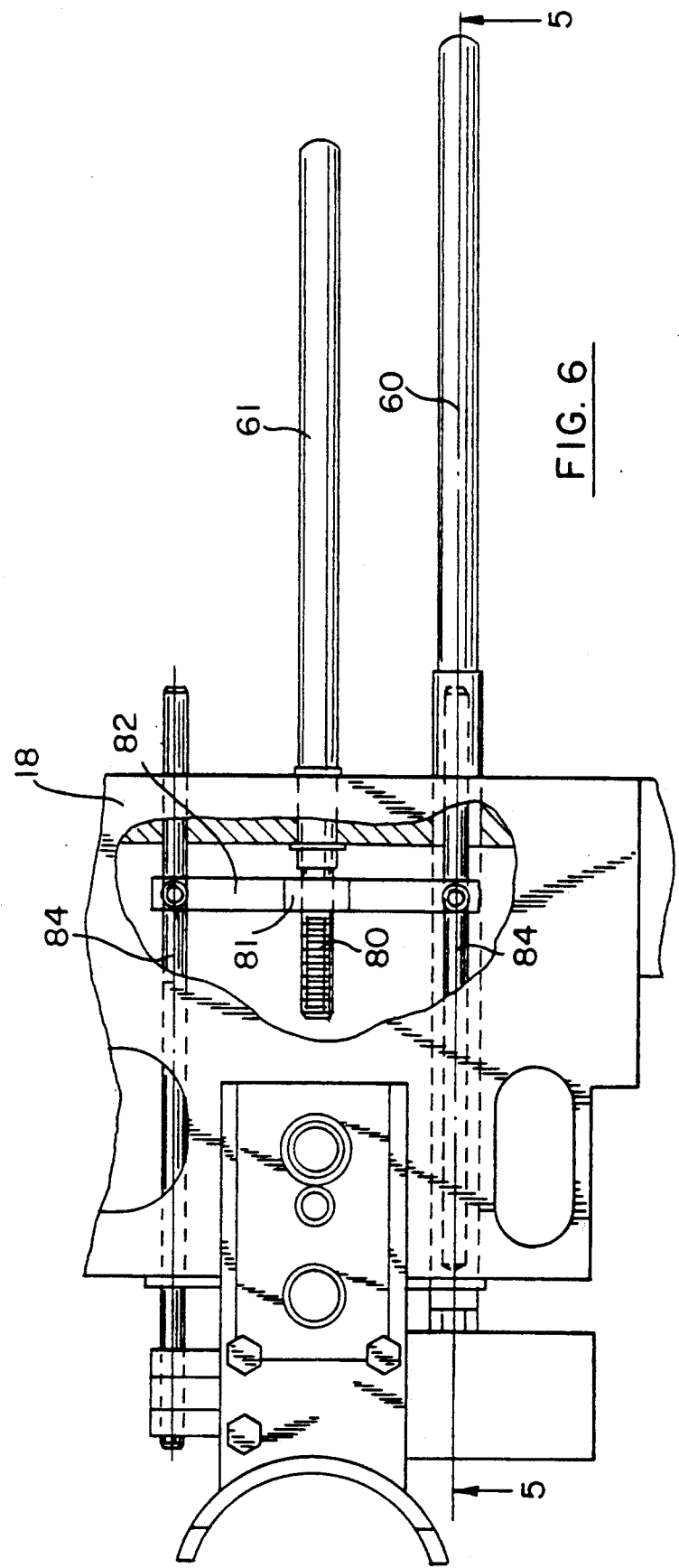
FIG. 6 is an enlarged view of a portion of FIG. 1, with the shear removed.

The front threaded end of the drop guide longitudinal displacement driven shaft 61 (FIG. 6) has a threaded portion 80 which is coupled to a nut 81 carried by a cross link 82 which is connected to a pair of rods 84 slidably supported within the housing 18 for relative axial displacement. The base 62 of the drop guide is secured to these rods so that rotation of the control knob 28 will advance or retract the drop guide. A notch 86 is defined near the front end of these rods (FIG. 7) and the front end of the drop guide transverse displacement driven shaft 60 has an annular groove 88 which are captured by the bottom surface of the connecting plate 90 and the cut out 89 when the plate is shifted to the latching position shown in FIG. 7. When the connecting plate is released by loosening a pair of screws 92 which pass through enlarged plate holes 94 and which are received by the drop guide base 62 and shifted to the right so that the plate becomes spaced from the lower left rod 84 and so that a large cut out 98 is adjacent and spaced from the lower right rod 84 and the cut out 89 is spaced from the shaft 60, the entire drop guide assembly can be pulled off the three rods and replaced with another assembly. The pinion 72 (FIG. 5) is secured with a screw 95 to the pinion shaft 60 and the front end of the shaft is supported by a bearing 96 which is press fit within a base opening. The rear opening 99 of the base is large enough so that when the base 62 is released it can be completely pulled from the pinion and supporting shaft.

I claim:

1. A shear mechanism for shearing discrete gobs from a runner of molten glass comprising
    a shear assembly,
    a frame including opposed ends,
    a pair of parallel guide rails extending horizontally between said ends,
    means for mounting said shear assembly on said guide rails for reciprocating longitudinal displacement,
    said shear assembly including at least one shear,
    a corresponding number of gob drop guide assemblies, each including a base portion and a top portion having a drop guide, said base portion including means for supporting said top portion for horizontal linear displacement transverse to the longitudinal direction of displacement of said shear assembly, means for selectively longitudinally displacing said base portion relative to said associated shear and means for transversely displacing said top portion relative to said base portion at any longitudinal position of said base portion.

2. A shear mechanism according to claim 1, wherein said transversely displacing means comprises a rack secured to said top portion and a shaft having a pinion secured thereto for driving said rack.

3. A shear mechanism according to claim 2, wherein said top portion supporting means includes a slide surface.

4. A shear mechanism according to claim 3, wherein said longitudinally displacing means includes a pair of supporting rods slidably supported by said shear assembly and means for securing said base portion to said rods.

* * * * *